April 26, 1960      J. W. FRASURE      2,933,847
ARTIFICIAL FISHING BAIT
Filed Nov. 25, 1958
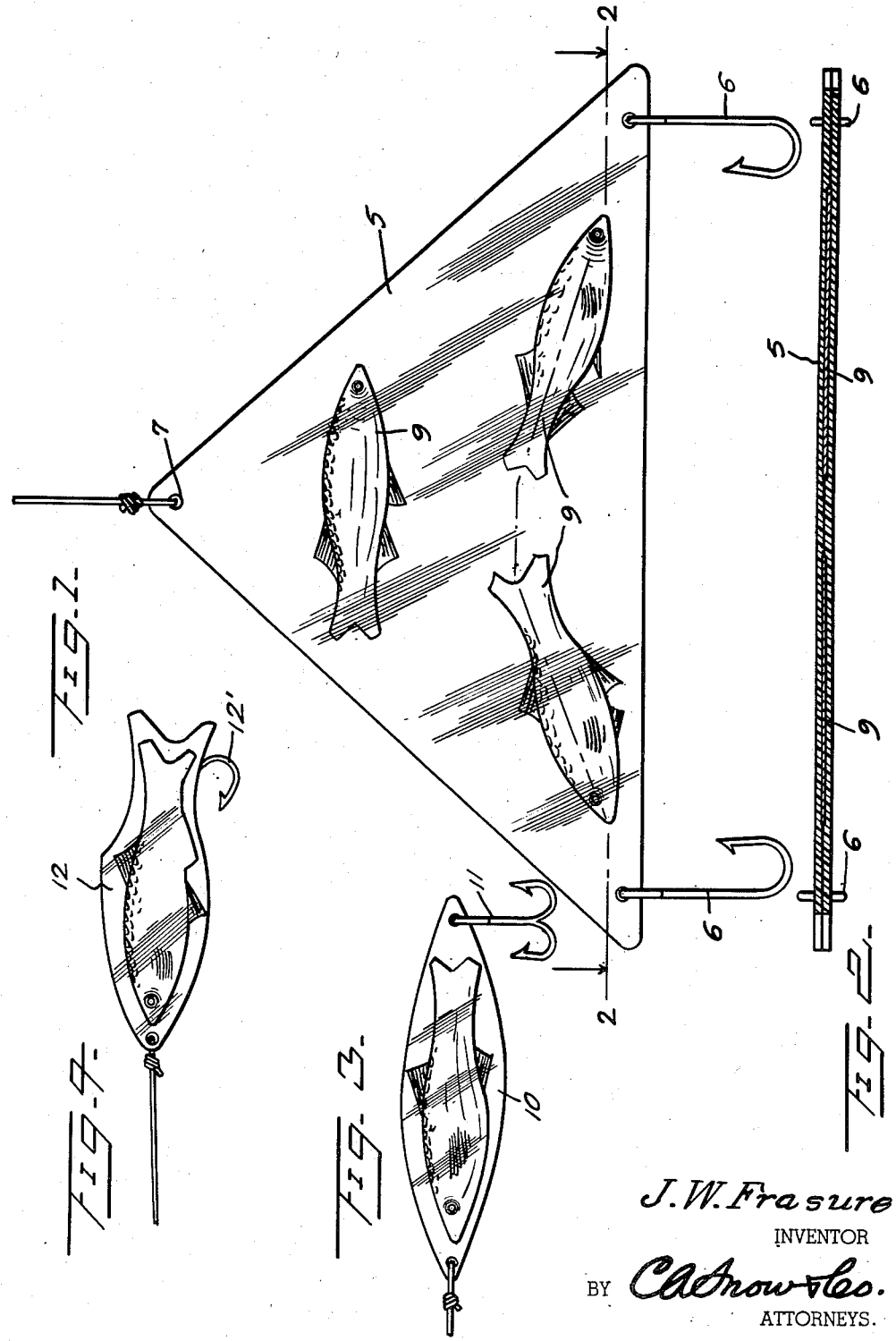
J. W. Frasure
INVENTOR
BY C. A. Snow & Co.
ATTORNEYS.

United States Patent Office 2,933,847
Patented Apr. 26, 1960

2,933,847

ARTIFICIAL FISHING BAIT

James W. Frasure, Sandusky, Ohio

Application November 25, 1958, Serial No. 776,290

1 Claim. (Cl. 43—42.74)

This invention relates to artificial fishing bait, the primary object of the invention being to provide a combined spreader and artificial bait of a permanent or indestructable character which may be used indefinitely.

A primary object of the invention is to provide artificial fishing bait embodying pictures or reproductions of fish held between layers of clear transparent plastic material so that the reproductions of the fish will be clearly visible, attracting fish which are eventually caught by the hooks carried by the artificial bait.

A further object of the invention is to provide artificial bait which will last indefinitely, owing to the protection to the simulated fish, offered by the plastic material covering the artificial bait.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is an elevational view of artificial bait constructed in accordance with the invention.

Fig. 2 is a sectional view taken on line 2—2 of Fig. 1.

Fig. 3 is an elevational view of a modified form of the invention.

Fig. 4 is a further modified form of the invention.

Referring to the drawing in detail, the body of the artificial bait is indicated generally by the reference character 5 and comprises a pair of identical transparent sheets of transparent plastic material between which pictures or objects simulating live fish, are held.

As shown by Fig. 1 of the drawing, the body 5 is substantially triangular in formation, to two of the corners of which are attached hooks 6, the remaining corner of the body having an opening 7 in which one end of the fishing line 8 is secured to effect control of the artificial bait necessary in fishing.

The artificial bait may be formed in many ways, as by painting or placing pictures of fish as indicated by the reference character 9, and since the body of the artificial bait comprises clear transparent plastic material, it is obvious that when the artificial bait is in use and is submerged in the water, the representations of live fish will be clearly visible through the plastic material, the plastic body being invisible so that the presence of the plastic body will not in any manner detract from the representations of the fish.

As shown by Fig. 3 of the drawing, the principle of the invention is carried out by the production of casting bait in which the body 10 is constructed of clear transparent plastic material in which a representation of a live fish is embedded to attract fish to the bait, the fish being caught by the hooks 11 carried at one end thereof.

As shown by Fig. 4, the artificial bait includes a body 12 of clear transparent plastic material in which a representation of a fish or bait is encased and visible through the transparent body.

A fish hook 12 is embedded in the plastic material with the prong thereof exposed to catch a fish in making a strike in an attempt to grab the bait. This type of artificial bait has proved effective in trawling.

From the foregoing it will be seen that due to the construction shown and described, I have provided artificial bait which includes a body constructed of clear plastic material of triangular construction, there being fish hooks connected at corners of the transparent body, the body acting as a spreader for maintaining the hooks separated or spread apart, so that fish caught on one hook will not interfere with fish caught on the other hook.

Having thus described the invention, what is claimed is:

A combined spreader and artificial bait, comprising a body constructed of a pair of triangular layers of clear transparent sheets of plastic material between which representations of live bait are held, said representations of live bait being visible through both sides of said body, fishing hooks attached to opposite corners of said body, the combined lengths of said hooks being substantially less than the length of one edge of said body, and said body having an opening for attaching a fishing line to said body.

References Cited in the file of this patent

UNITED STATES PATENTS

| | | |
|---|---|---|
| 515,001 | Lamb | Feb. 20, 1894 |
| 1,782,010 | Meyer | Nov. 18, 1930 |
| 2,149,464 | Potts | Mar. 7, 1939 |
| 2,462,290 | Sauvey | Feb. 22, 1949 |
| 2,531,235 | Sicotte | Nov. 21, 1950 |

FOREIGN PATENTS

| | | |
|---|---|---|
| 281,100 | Great Britain | Dec. 1, 1927 |